INVENTOR.
R. L. ACKARET

United States Patent Office 3,095,604
Patented July 2, 1963

3,095,604
HOT RUNNER FOR MOLDING MACHINE
Robert L. Ackaret, Bartlesville, Okla., assignor to Phillips Petroleum Company, a corporation of Delaware
Filed Apr. 6, 1961, Ser. No. 101,113
6 Claims. (Cl. 18—5)

This invention relates to plastic forming apparatus comprising an improved runner.

In forming plastic materials, the material is plasticized and supplied to forming means such as a molding or extrusion die. In many instances it is not possible, or at least not practical, to move the plasticized material directly from the plasticizing means to the forming means and in these instances some form of means for conducting the material must be provided. Such a device is called a runner. It is necessary to prevent solidification of the plasticized material within the runner and this normally is accomplished by forming the runner channel in a relatively large mass of metal and often, providing heating means. However, in those instances where the runner channel is not straight, it is difficult to form the runner channel with sufficient smoothness and sufficiently well stream lined with absolutely no dead spots or pockets in which the plasticized material can hang up and burn. Presently known types of runners are either very expensive or unsatisfactory.

An object of this invention is to provide plastic forming apparatus utilizing an improved runner.

Other aspects, objects and the several advantages of this invention are apparent from the specification, the drawing and the appended claims.

The improved runner for conducting plasticized material comprises a solid metal member having a passageway therethrough formed by a curved tubular conduit. I have found that a superior runner can be made by utilizing stainless steel for the tubular conduit in the form of a seamless tube and utilizing aluminum for the body of the member. Heat can be supplied efficiently by embedding heating means, preferably cartridge type electrical heaters, within the body of the member.

According to my invention there is provided improved plastic forming apparatus comprising plasticizing means, forming means, and the improved runner of my invention.

Figure 1:
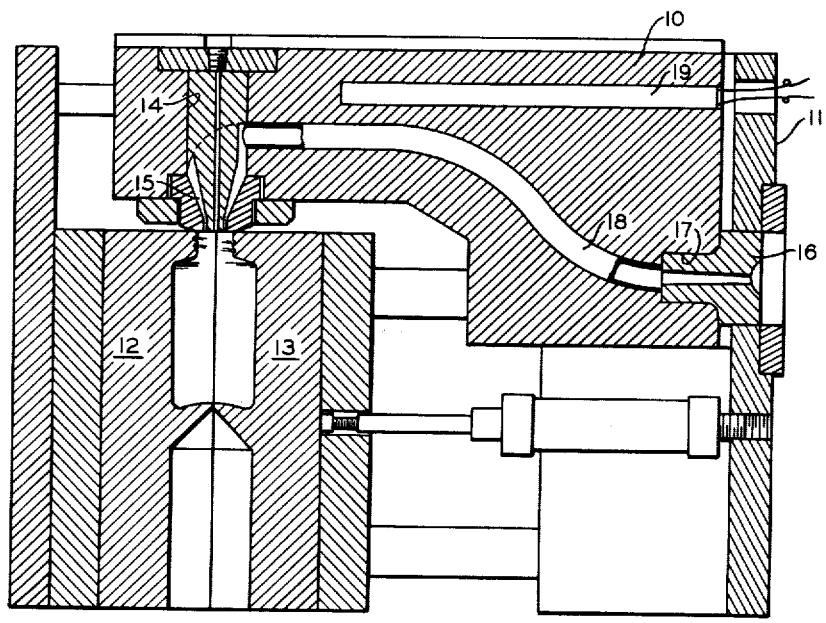
FIGURE 1 is a simplified vertical cross-section of forming means utilizing a runner according to my invention.
Figure 4:
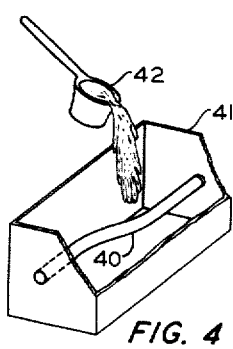
FIGURE 4 illustrates making a runner by casting the body of the runner around a curved tubular conduit.

The machine illustrated in FIGURE 1 comprises a metal member 10, a frame 11 and a two-piece mold comprising sections 12 and 13. A vertical passageway 14 is machined in metal member 10 and encloses parison die 15. An adapter 16 is fitted into a machined passage 17 in one side of metal member 10. Member 10 also comprises the runner, the channel of which is formed by a seamless metal tube 18 embedded therein. In the embodiment illustrated in FIGURE 1, tube 18 is encased in member 10 by casting the member around the curved tubular conduit, as illustrated in FIGURE 4. A similar structure can be made according to the method illustrated in FIGURE 5 wherein member 10 is made up of two separate metal members joining on a plane encompassing the axis of tube 18.

One or more cartridge type electrical heaters 19 are provided and supply heat to the plastic material within tube 18 to prevent hardening thereof, the metal member 10, having a high thermal conductivity, tending to equalize the application of heat throughout the length of tube 18.

The nozzle of a plasticizing and feeding apparatus, not shown, is placed against adapter 16 and the plasticized material forced through tube 18 and out through parison die 15 forming an elongated parison depending therefrom. Sections 12 and 13 of the mold are then moved into position, the lower end of the mold portion pinching off the lower end of the parison and forming a continuous bottom for the item to be molded. Air is then forced in through the air passage in the center of parison die 15 thus expanding the parison to conform with the shape of the mold to form the desired object. Although the injection of the plasticized material is intermittent, the design and construction of the runner prevents hardening of the material therein.

Since the channel of the runner has perfectly formed inner walls comprising the inner walls of a preformed tubular conduit, the channel is streamlined and contains no dead spots or pockets where the plasticized material may remain longer than is desirable. Such undesired retention of the material may result in degradation of the material iself and eventually cause plugging of the runner channel or possibly a carryover into the molded item of damaged material.

Figure 2:
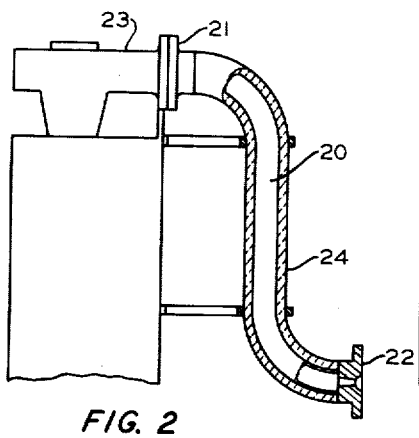
FIGURE 2 illustrates a runner made from a metal tubing encased within an insulating layer.

FIGURE 2 illustrates an embodiment of the invention in which a curved seamless tube encased in a layer of insulation forms the runner. The tubular conduit 20 is provided with a flange 21 at one end and adapter 22 at the other. Flange 21 provides means for attachment to the body 23 containing a die through which plastic material is extruded, as for example, to form the parison for a blow molding operation. A layer 24 of insulating material is provided over the entire surface of tube 20, thus reducing the loss of heat therefrom and preventing hardening of plastic material which remains for short periods of time.

Figure 3:
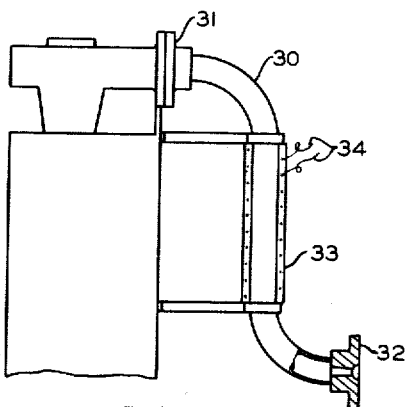
FIGURE 3 illustrates a runner made from a metal tubing having an electrical heater wrapped on its outer surface.

FIGURE 3 illustrates a similar tubular runner but provided with heating means rather than the insulation relied upon in the embodiment of FIGURE 2. This embodiment comprises a curved seamless tubular conduit 30, a flange 31, adapter 32 and a heater 33, as for example, an electrical band heater provided with energy through leads 34 from a source of electrical energy not shown.

The method of making my improved runner by casting molten metal around a curved seamless metal tubular conduit is described in connection with the illustration of FIGURE 4. The tubular conduit 40 is placed in position within mold 41 and molten metal poured therein as from ladle 42. This drawing is, of course, schematic, and mold 41 can be, for example, a sand mold or other suitable molding apparatus. I have found that a superior runner results when conduit 40 is made of stainless steel and the cast body is made of aluminum.

Another method for the manufacture of an improved runner is described in connection with the illustration of FIGURE 5. A metal member 50 has a planar surface 51 into which is machined a groove having a semi-circular cross-section in the shape of the desired runner channel. A similar member (not shown) has a corresponding groove carved in a similar planar surface so that when the two are placed together, a tubular conduit similar to that illustrated in FIGURE 4, can be enclosed therein. The groove 52 and tubular conduit 53 are sized so that the conduit fits snugly therein resulting in considerable surface contact between the two, but it is not essential that the groove 52 be absolutely perfect since the materials from which both the conduit 53 and the body member are constructed have a high thermal conductivity. In another embodiment, the straight portion of the runner is machined in the two halves and used without an inserted pipe while the curved portion is machined somewhat longer and a pipe inserted. A runner can be made by machining the two halves and fitting together without a separate tubular conduit if very accurate machining is done.

Figure 5:
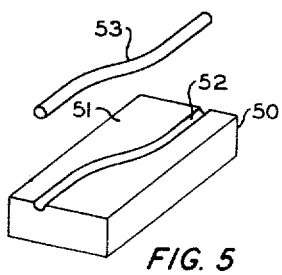
FIGURE 5 illustrates making a runner by machining one-half of a passageway in each of two metal members and encasing a metal tubular conduit therein.

The members illustrated in both FIGURES 4 and 5 can be provided with additional structure, as for example, a parison die as illustrated in FIGURE 1 or the members can be constructed to serve simply as runners alone.

Reasonable variation and modification are possible within the scope of this invention wherein are set forth improved runners comprising a channel formed from a curved tubular conduit encased within a solid metal member, a runner comprising a curved tubular conduit and encased within an insulating layer, a runner comprising a curved tubular conduit having heating means thereon and a method of manufacturing an improved runner by casting a metal body around a curved tubular conduit and a method for manufacturing a runner by forming semi-circular cross-section grooves in matching planar surfaces and inserting a curved tubular conduit therein.

I claim:

1. A molding machine comprising molding means, plasticizing means for supplying moldable plastic material to said molding means, a hot runner for conducting moldable material from said plasticizing means to said molding means, said runner comprising a solid metal member having a passageway therethrough formed by a curved unitary seamless metal tubular conduit and heating means encased within said member.

2. The molding machine of claim 1, wherein said solid metal member is a unitary cast around said conduit.

3. The molding machine of claim 1, wherein said solid metal member is formed of a pair of solid metal halves, having coincident planar surfaces and corresponding adjacent curved grooves in said surfaces, said conduit being fitted into said grooves.

4. The molding machine of claim 1, wherein said molding means comprises a parison die, and a sectional mold for molding a parison extruded by said die.

5. The molding machine of claim 4, wherein said solid metal member is a unitary body cast around said conduit.

6. The molding machine of claim 4, wherein said solid metal member is formed of a pair of solid metal halves, having coincident planar surfaces and corresponding adjacent grooves in said surfaces, said conduit being fitted into said grooves.

References Cited in the file of this patent

UNITED STATES PATENTS

| | | |
|---|---|---|
| 1,454,291 | Lehman | May 8, 1923 |
| 2,190,828 | Deitz et al. | Feb. 20, 1940 |
| 2,201,024 | Brown | May 14, 1940 |
| 2,303,778 | Wesley | Dec. 1, 1942 |
| 2,466,676 | Boling et al. | Apr. 12, 1949 |
| 2,516,689 | France et al. | July 25, 1950 |
| 2,528,260 | Cademartori | Oct. 31, 1950 |
| 2,720,799 | Pfost | Oct. 18, 1955 |
| 2,724,860 | Strong | Nov. 29, 1955 |
| 2,749,608 | Siemer | June 12, 1956 |
| 2,840,897 | Ingalls | July 1, 1958 |
| 2,858,564 | Sherman et al. | Nov. 4, 1958 |
| 2,871,515 | Loew | Feb. 3, 1959 |
| 2,901,775 | Goff | Sept. 1, 1959 |
| 2,952,871 | Loeser | Sept. 20, 1960 |

UNITED STATES PATENT OFFICE
CERTIFICATE OF CORRECTION

Patent No. 3,095,604                                         July 2, 1963

Robert L. Ackaret

It is hereby certified that error appears in the above numbered patent requiring correction and that the said Letters Patent should read as corrected below.

Column 4, lines 16 and 17, after "adjacent" insert -- curved --.

Signed and sealed this 28th day of April 1964.

(SEAL)
Attest:

ERNEST W. SWIDER                                   EDWARD J. BRENNER

Attesting Officer                                          Commissioner of Patents